Dec. 16, 1958 W. G. TOLAND 2,864,298
ROTARY HOE
Filed Feb. 17, 1956
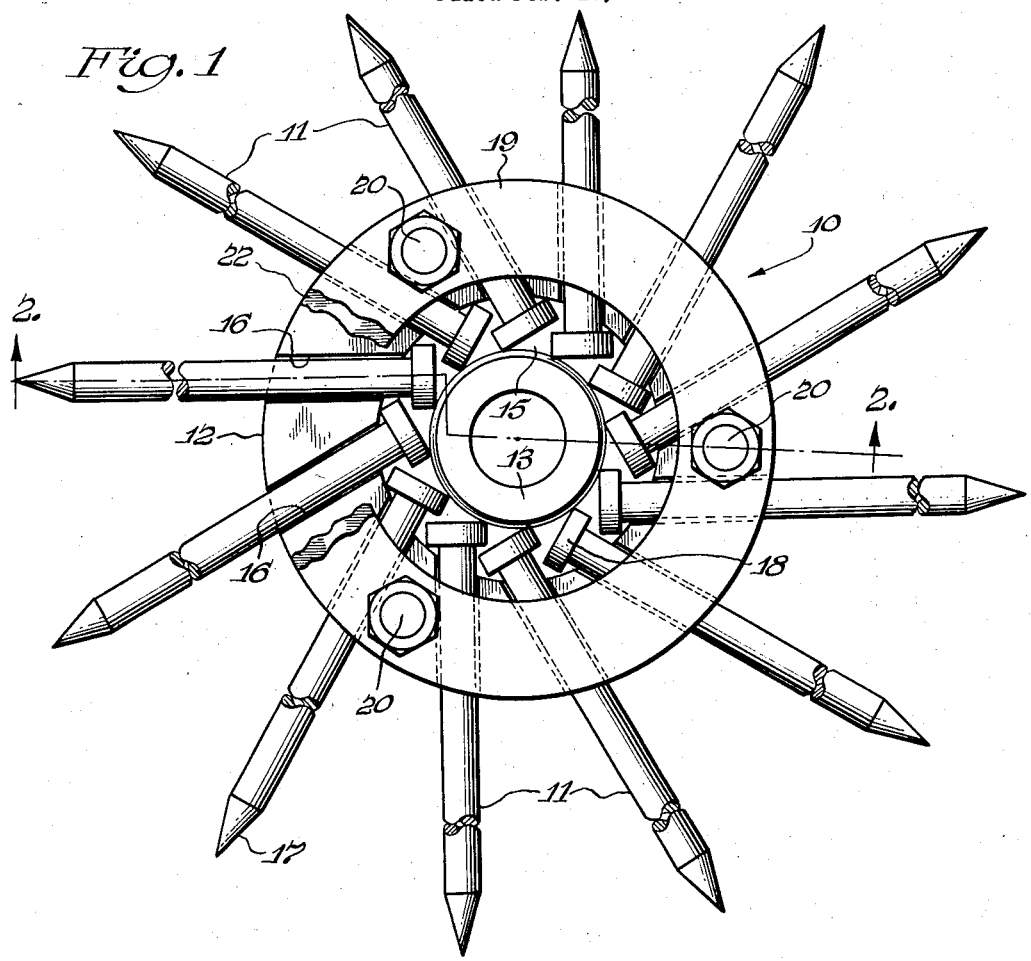
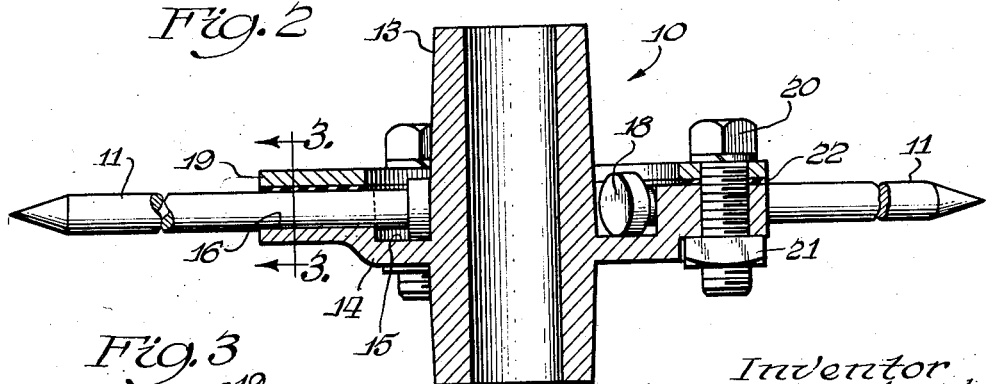
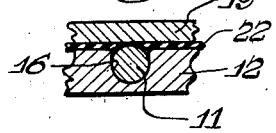
Inventor
Wayne G. Toland
Paul O. Pippel
Attorney

United States Patent Office 2,864,298
Patented Dec. 16, 1958

2,864,298

ROTARY HOE

Wayne G. Toland, Stockton, Calif., assignor to International Harvester Company, a corporation of New Jersey Application February 17, 1956, Serial No. 566,176

3 Claims. (Cl. 172—556)

This invention relates to agricultural implements and particularly to cultivators. More specifically the invention concerns a cultivator of the rotary or spiked hoe type.

A rotary hoe is, in general, a wheel having radially projecting spikes adapted to roll over a crop row and destroy weeds by penetration of the spikes in the ground and the consequent disturbance of the soil and root structure of the weeds. Rotary hoes of this character are generally complicated in construction and expensive to produce as well as to repair, and the replacement of bent and broken teeth is a time-consuming operation. In addition to being inexpensive and easy to repair, a successful rotary hoe should be relatively light in weight and strong and should readily shed leaves and other trash picked up by the spikes.

An object of this invention, therefore, is the provision of an improved spike weeder or rotary hoe adapted to be mounted upon a traveling support such as a tractor and to be rotated by contact of the spikes with the ground being treated.

Another object of this invention is the provision of a spike weeder or toothed rotary hoe so constructed as to readily shed leaves and trash picked up by the teeth during operation of the hoe.

Another object of the invention is the provision of a spike tooth weeder in which the teeth are quickly and easily assembled or replaced and wherein means are provided accommodating the substitution of teeth of a different size.

Other objects and advantages of the invention will become clear from the following detailed description when read in conjunction with the accompanying drawings, wherein:

Figure 1 is a side view of the weeder of this invention with parts broken away to illustrate the manner in which the teeth are mounted in the hub of the wheel;

Figure 2 is a section taken on the line 2—2 of Figure 1; and

Figure 3 is a detail in section taken on the line 3—3 of Figure 2.

Referring to the drawings, it will be observed that the numeral 10 designates generally a mounting plate structure adapted to support the spike teeth 11 and comprising an annular ring portion 12 and an axially extending hub portion 13 connected to the ring portion 12 by an outwardly offset web portion 14 forming an annular cup or channel-like space 15 between ring 12 and the hub 13.

A plurality of circumferentially spaced grooves 16 are provided in the ring portion 12 of hub 10, and it will be observed that each of these grooves is tangent to the bearing portion 13. Each groove 16 extends through the ring portion 12 and communicates with the cup-like space 15.

Each groove 16 is adapted to receive therein the upper end of the shank of one of the elongated spikes 11. Each of the spikes or teeth 11, in the form illustrated, is a fifty-penny nail and is of a diameter substantially equal to the depth of the groove 16 and is provided with a sharpened tip 17 and a head 18.

It will be observed that the head 18 of the spike tooth 11 is broader than the diameter of the groove 16 and is retained thereby against radial displacement outwardly from the groove 16. Likewise, sliding of the teeth 17 inwardly is limited by engagement of the nail head with the bearing portion 13 of the hub.

The nails 11 are retained in the grooves 16 by the provision of a mating annular ring 19, held in place against the face of the ring portion 12 by a plurality of bolts 20 receivable in registering apertures provided in the parts 12 and 19 and removably secured by nuts 21. Thus it will be noted that by simply removing the bolts 20, the ring 19 is readily separated from the hub 10 for easy replacement or assembly of spikes 11 in the grooves 16.

Provision is made for the replacement of fifty-penny nails 11 with larger or smaller nails, as desired. For this purpose ring portion 12 and annular member 19 are separated by a gasket of resilient material in the form of a rubber ring 22.

Due to the manner in which the spikes are mounted in the novel rotary hoe of this invention, a minimum of trash is picked up by the spikes. Thus, the wheel revolves clockwise as viewed in Figure 1, and due to the tangential relationship of the spikes to the wheel axis the spikes remain almost vertical until they leave the ground so that trash drops from the spikes to the ground.

From the foregoing it will be clear that a simple and economical spiked weeder or rotary hoe has been devised in which cost has been reduced to a minimum and the problem of assembly and the replacement of worn and damaged spikes has been facilitated by the use of common nails. It should also be understood that the invention has been described in its preferred embodiment only, and that modifications may be made therein without departing from the spirit of the invention or the scope of the appended claims.

What is claimed is:

1. In a rotary hoe, a hub including a ring portion, an axially extending bearing portion and an outwardly offset web connecting said portions and providing an annular channel-like space therebetween, a plurality of circumferentially spaced grooves formed in said ring portion and extending outwardly from said annular space to the outer periphery of said ring portion, an elongated spike slidably received in each of said grooves having a head broader than the diameter of said groove and received in said annular space and engageable with said bearing portion and a shank extending beyond the outer periphery of the ring portion, a mating annular ring adapted to mate with the ring portion of said hub to hold the spikes in said grooves, means for removably securing said mating ring to said hub, and a resilient spacer between said rings accommodating spikes of different diameter therebetween.

2. The invention set forth in claim 1, wherein said grooves are straight and are tangential to said bearing portion.

3. In a rotary hoe, a hub including a ring portion and an axially extending cylindrical bearing portion with a channel-like annular space therebetween, a plurality of circumferentially spaced grooves formed in said ring portion tangent to the the axis thereof and extending from the outer periphery of said ring portion to said annular space, a plurality of elongated tangentially projecting spikes disposed in said grooves, each said spike having a shank receivable in one of said grooves and having a diameter at least equal to the depth of said groove and a broadened head of a greater diameter than that of said groove disposed in said annular space to prevent outward displacement thereof from said ring portion in the tangential direction of said grooves an annular plate adapted to fit over said bearing portion and mate with said ring portion, and a resilient spacer between said plate and said ring portion arranged to optionally accommodate the placing of spikes of different diameter therebetween.

References Cited in the file of this patent

UNITED STATES PATENTS

| 622,162 | Pattisson | Mar. 28, 1899 |
| 1,244,982 | Horst | Oct. 30, 1917 |
| 2,253,391 | Ohlendorf | Aug. 19, 1941 |

FOREIGN PATENTS

| 731 | Great Britain | 1872 |